United States Patent
Nallanathan et al.

(12) 
(10) Patent No.: US 6,728,295 B1
(45) Date of Patent: Apr. 27, 2004

(54) CODE DIVISION MULTIPLE ACCESS COMMUNICATION SYSTEM USING OVERLAPPING SPREAD SEQUENCES

(75) Inventors: Arumugam Nallanathan, Colombo (LK); Tung Sang Ng, Pokfulam (HK); Shing Chow, New Terriroties (HK)

(73) Assignee: University of Hong Kong, Hong Kong (HK)

(*) Notice: Subject to any disclaimer, the term of this patent is extended or adjusted under 35 U.S.C. 154(b) by 723 days.

(21) Appl. No.: 09/607,749

(22) Filed: Jun. 30, 2000

Related U.S. Application Data

(60) Provisional application No. 60/141,635, filed on Jun. 30, 1999.

(51) Int. Cl.[7] .................................................. H04J 11/00
(52) U.S. Cl. ....................................... 375/140; 370/208
(58) Field of Search ................................ 375/130, 140, 375/146; 370/203, 208, 209, 342, 441

(56) References Cited

U.S. PATENT DOCUMENTS 5,644,523 A * 7/1997 Lin ............................ 708/607

OTHER PUBLICATIONS

Brislawn, C.M., "A simple lattice Architecture For Even–Order Linear Phase Perfect Reconstruction Filter Banks," IEEE, 1994, Abstract.*

* cited by examiner

Primary Examiner—Stephen Chin
Assistant Examiner—Kevin Kim
(74) Attorney, Agent, or Firm—Jones Day

(57) ABSTRACT

This invention discloses a code division multiple access communications system based on spread sequences designed by using complete factorization of polyphase matrix of a perfect reconstruction (PR) filter bank. The key characteristic is that the length of the spread sequence is longer than the period of the data symbol i.e., the data symbols are spreaded by the spread sequence and overlapped with neighboring data symbols. The design method includes an orthogonal code generator, a number of cascading stages and random permutation matrices. The number of cascading stages and random permutation matrices are selected according to the length of the spread sequence required. The length of the spread sequence could be selected according to the system performance requirement, hence the overlapping factor of spreaded data symbols. Furthermore, this spread sequence assumes integer values instead of binary when the orthogonal code generator generates a Walsh-Hadamard code. The number of integer values level could be limited by employing proper permutation matrices. This spread sequence generation method could be implemented using simple integer arithmetic. Furthermore, This spread sequences are highly secured since random permutation matrices are used.

13 Claims, 5 Drawing Sheets

CODE DIVISION MULTIPLE ACCESS COMMUNICATION SYSTEM USING OVERLAPPING SPREAD SEQUENCES

CROSS REFERENCE TO RELATED APPLICATION

This application claims the benefit of provisional application No. 60/141,635, filed on Jun. 30, 1999.

BACKGROUND OF THE INVENTION

The present invention relates to code division multiple access communication systems based on spread sequences designed by using complete factorization of a polyphase matrix of a perfect construction (PR) filter bank. It is especially suitable for use in mobile communication system where the channels between transmitters and receivers are characterized by multipath fading. This spread sequence is applicable in mobile stations or in base stations where code division multiple access (CDMA) is utilized. In addition to mobile communication systems, this spread sequence could be utilized in personal communication system (PCS) and digital cellular system. The invention facilitates better communication over channels characterized by fading and jamming.

In mobile communication systems, the channels between transmitters and receivers are characterized by multipath fading as well as by additive noise. Various approaches have been taken to minimize these errors by means of coding and decoding in the transmitters and receivers respectively. In an alternative approach, spread sequences which are significantly longer than the data symbol have been used to minimize the errors due to multipath fading. By employing spread sequences which are significantly longer than the data symbol interval, the transmission of each data symbol of each user is spread over a wide temporal and spectral content. The data symbols spread by these sequences are overlapped with neighboring data symbols to maintain the same bandwidth. A brief description appears on "Spread-Signature CDMA: Efficient multiuser communications in the presence of fading" by G. W. Wornell in IEEE Transactions on Information Theory, pp 1418–1438, Vol 41, No.5, September 1995 (U.S. Pat. No. : 5,570,351). Wornell used a structure to design longer spread sequences with binary values. Although the codes are binary valued, the transmitted streams generated via modulation are not binary values. Modulated data streams are integer valued. At the same time, the length of the code increases exponentially with the number of users. For example, if the number of users is M, overlapping is constrained to $M^k$, k=1,2,3, . . . i.e., the sequence length is constrained to $M^2, M^3, M^4, \ldots$ etc.

SUMMARY OF THE INVENTION

The present invention provides a spread sequence design method for code division multiple access communication system using complete factorization of the polyphase matrix of a perfect reconstruction (PR) filter bank. The length of the spread sequence is longer than the period of the data symbol i.e., the data symbols are spread by the spread sequence and overlapped with the neighboring data symbols. A similar spread sequence is employed at the receiver to demodulate the received data stream. Multiple units could be employed at the receiver to process the delayed versions of the received signal and combine by maximal ratio, equal gain or other alternative criteria to generate decision variable. According to the present invention, the spread sequence design method includes an orthogonal code generator to generate an orthogonal matrix and cascading stages which comprise additions, subtractions and shifting operations. The number of cascading stages is determined according to the number of sequences and the length of the sequences required. Random permutation matrices are used at every cascading stage to randomize the spread sequences.

According to another aspect of the present invention, the present sequence is implemented in QPSK. This includes an orthogonal code generator to generate a Walsh-Hadamard matrix and cascading stages which comprise additions, subtractions and shifting operations. The number of cascading stages is determined according to the number of sequences and the length of the sequences required. Random permutation matrices are used at every cascading stage to randomize the spread codes. An interleaving coder encodes the input data symbols into two data series and assigning then to the I-phase and the Q-phase respectively, in a QPSK modulator. A first upsampler and sequence modulator for the data series is assigned to the I-phase. A second upsampler and sequence modulator for the data series is assigned to the Q-phase. According to another aspect of the present invention, the integer valued spread sequence design method includes a Walsh-Hadamard code generator to generate a Walsh-Hadamard matrix and cascading stages which comprise additions, subtractions and shifting operations. The number of cascading stages is determined according to the number of sequences and the length of the sequences required. Random permutation matrices are used at every cascading stage to randomize the spread sequences.

According to another aspect of the present invention, the present integer valued sequence is implemented in QPSK. This includes a Walsh-Hadamard code generator to generate a Walsh-Hadamard matrix and cascading stages which comprise additions, subtractions and shifting operations. The number of cascading stages is determined according to the number of sequences and the length of the sequences required. Random permutation matrices are used at every cascading stage to randomize the spread codes. An interleaving coder encodes the input data symbols into two data series and assigns them to the I-phase and the Q-phase respectively, in a QPSK modulator. A first upsampler and sequence modulator for the data series is assigned to the I-phase. A second upsampler and sequence modulator for the data series is assigned to the Q-phase.

Moreover, in the present invention, the number of cascading stages and permutation matrices are selected according to the number of sequences and the length of the sequences required. The length of the sequence is determined according to the performance requirement. By employing spread sequences which are longer than the period of data symbol, the transmission of each data symbol of each user is spreaded over a wide temporal and spectral extent. Furthermore, when the sequences are designed from a Walsh-Hadamard matrix and with some cascading stages, it can be implemented using simple integer arithmetic. The number of integer values level could be limited by employing proper permutation matrices. By incorporating a predetermined random permutation matrix, the sequence can be designed to be time varying sequence. Furthermore, This spread sequences are highly secured since random permutation matrices are used.

As will be appreciated, the invention is capable of other and different embodiments, as its several details are capable of modifications in various respects, all without departing from the invention. Accordingly, the drawings and description of the preferred embodiments are to be regarded as illustrative in nature and not restrictive.

BRIEF DESCRIPTION OF DRAWINGS

The present invention will be apparent to those skilled in the art in view of the accompanying drawings, wherein.

DESCRIPTION OF THE PREFERRED EMBODIMENTS

In a code division multiple access (CDMA) system, communication between base station and mobile station is established by employing a 'pseudo code'. A number of channels are formed between base station and mobile stations by assigning different spread sequences to each channel. It is desirable to generate as many sequences as possible to secure a plurality of channels. Normally, these channels are influenced by multipath fading. It is desirable to have longer spread sequences to reduce error due to multipath fading.

In a code division multiple access communication system employing a spread sequence according to a present embodiment, data symbols are spread using longer spread sequences and overlapped with neighboring data symbols so as to maintain the bandwidth of the conventional system. To avoid inter-symbol interference, these sequences satisfy certain orthogonality conditions. Further, the spread sequence design, which generates the above-mentioned sequence, is easily implemented in the communication device since the above mentioned sequence design includes simple integer arithmetic. At the same time, the length of the sequence is flexible.

Figure 1:
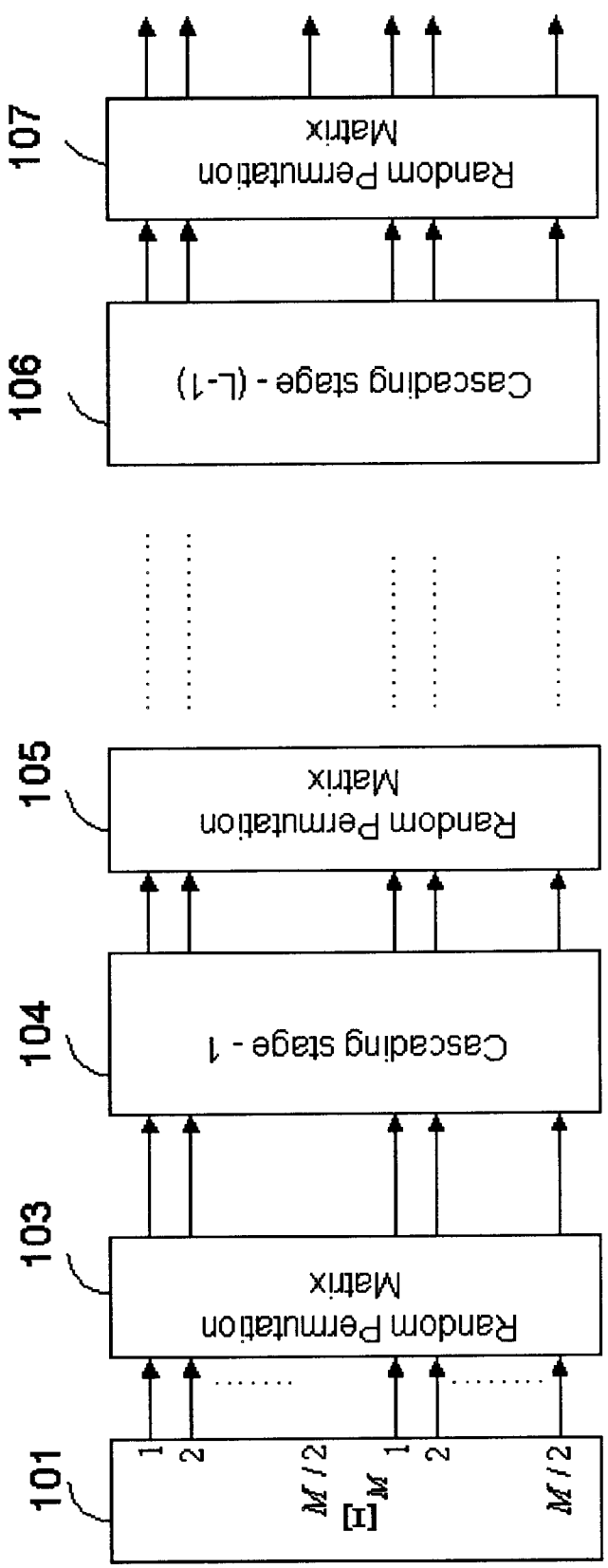
FIG. 1 is a block diagram illustrating the first embodiment of spread sequence design method for spread spectrum code division multiple access communication system according to the present invention.

FIG. 1 is a block diagram illustrating the first embodiment of the spread sequence (integer valued) design method according to the present invention. The spread sequence design method shown in FIG. 1 includes an (M×M) Walsh code generator 101 (where M is the number of codes to be generated), cascading stages 104, . . . ,106 and random permutation matrices 103,105 . . . ,107. (L−1) cascading stages are employed to design spread sequences with length LM. The number of cascading stages and random permutation matrices are selected according to the length of the sequence required.

The Walsh-Hadamard code generator 101 generates an (M×M) matrix. This matrix is separated into two portions, upper and lower. Each portion is an (M/2×M) matrices. By adding one cascading stage with Walsh-Hadamard matrix, a matrix having dimensions M×2M is formed. Each row of the matrix constitutes a spread sequence with a length of 2M. By adding cascading stages, the length of the spread sequence is increased by a factor of M for each cascading stage. Random permutation matrices are added to randomize the sequences by rearranging each row of the matrix. By controlling random permutations in a predetermined manner, spread sequences can be made as time varying code. By incorporating random permutation matrices, the sequences are made more secured.

Figure 2:
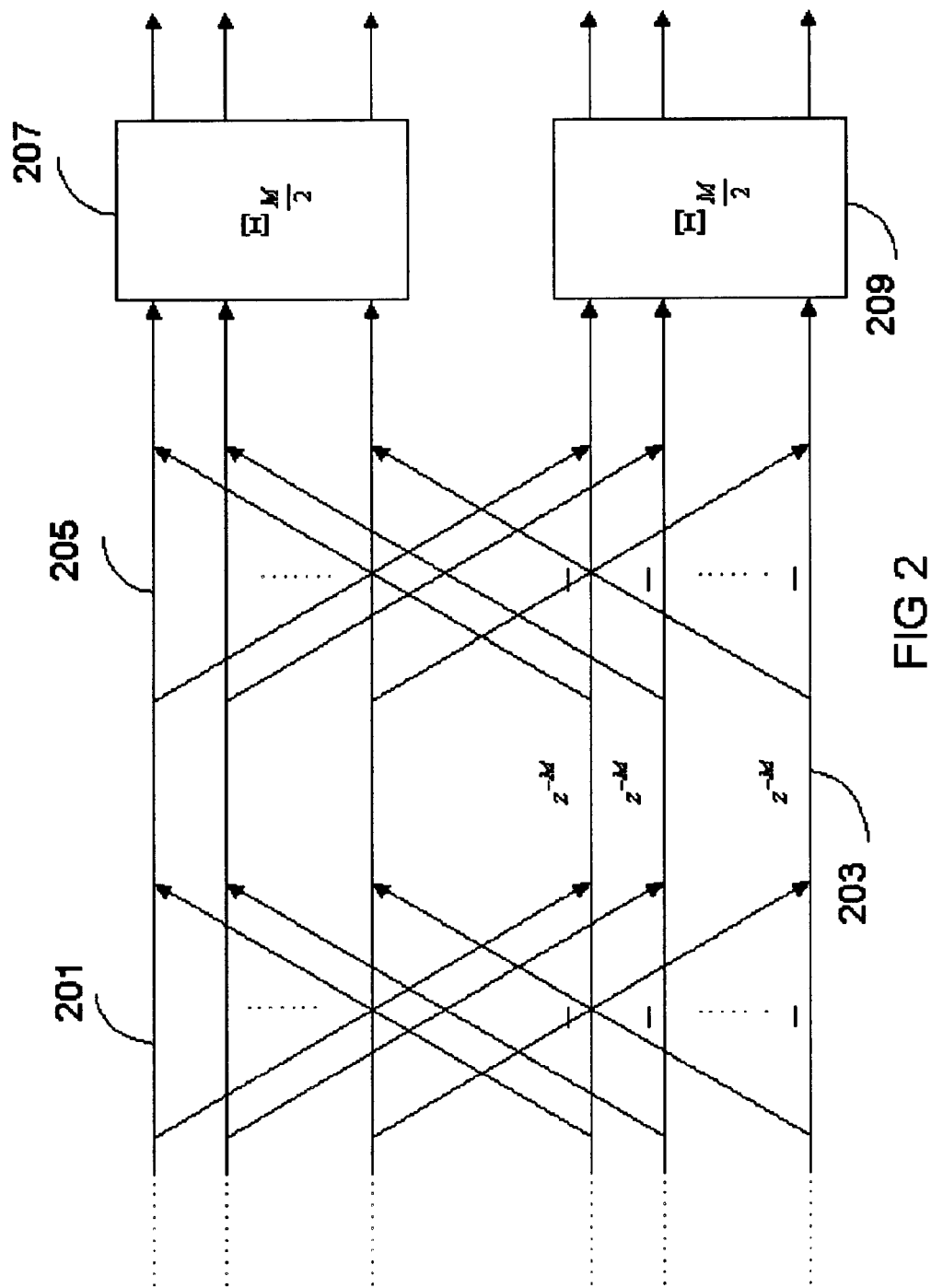
FIG. 2 is an explanatory view illustrating a cascading stage of FIG. 1.

FIG. 2 is an explanatory view illustrating a cascading stage. The operation 201 performs addition and subtraction of the upper and lower part of the Walsh-Hadamard matrix. If we denote the upper part as $H_u$ and the lower part as $H_l$, $H_u+H_l$ and $H_u-H_l$ are obtained after the 201 operation. $H_u-H_l$ is shifted by M after the operation 203. The operation 205 performs the addition and subtraction between $H_u+H_l$ and shifts $H_u-H_l$. As a result of operations 201,203 and 205, an (M×2M) integer matrix is obtained from the (M×M) Walsh-Hadamard matrix. The matrices 207 and 209 are Walsh-Hadamard matrices with dimension (M/2×M/2).

Figure 3:
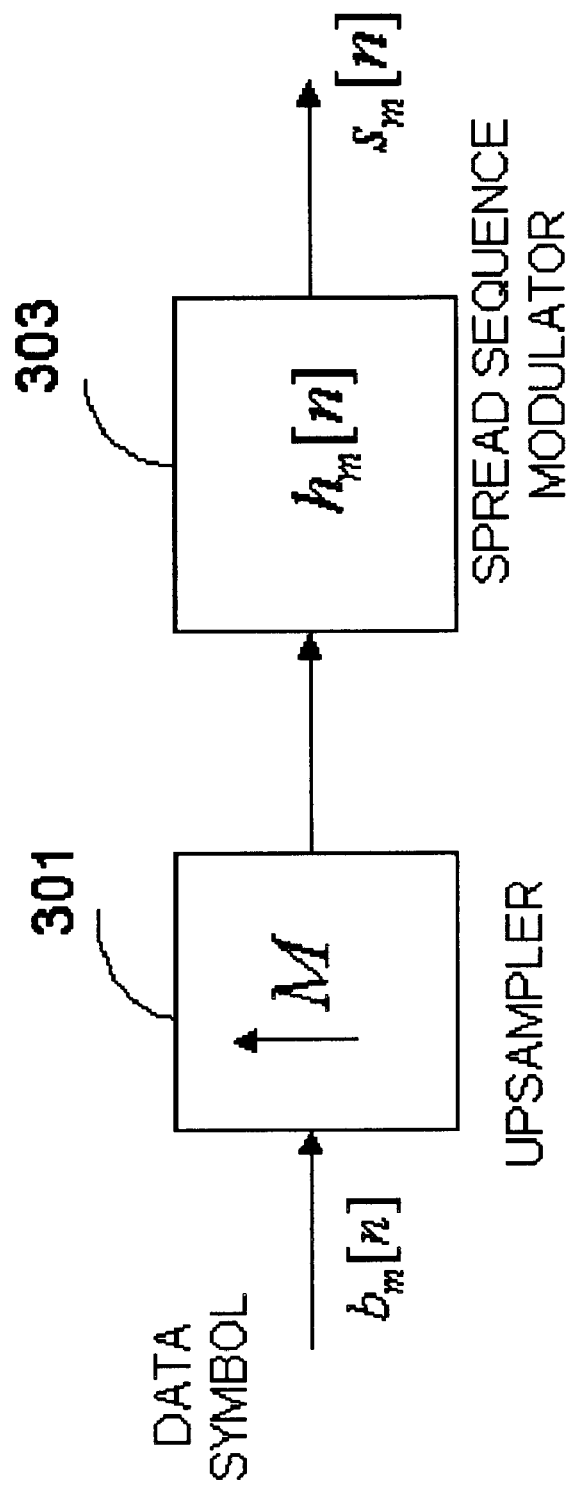
FIG. 3 is a block diagram illustrating the partial view of the transmitter to which the present invention is applied.

FIG. 3 is a block diagram illustrating the partial view of a transmitter, which employs the spread sequence designed in the present invention. The data symbols $b_m[n]$ could be coded using conventional precoding techniques. The precoder introduces redundancy into the data sequence. Such redundancy is useful in combating the effects of additive white noise encountered in the transmission channel. However, in the practice of the present invention, coding of this type is not required since the spread sequence is longer than the period of the data symbol.

The data symbols $b_m[n]$ are upsampled by an upsampler 301. Bandwidth is expanded by a factor of M. Such upsampling can be accomplished by inserting zeros between adjacent data symbols. Upsampled data symbols are convolved by a spread sequence modulator 303. Each user is then assigned a specific spread sequence.

Mathematically, spread sequence modulated data stream $s_m[n]$ for the m th user is constructed according to the following expression, $$s_m[n]=b_m[k]h_m[n-kM]  \quad\quad\quad\quad \text{Equation 1}$$

Where k is a constant. The square brackets in the expression indicate that the arguments are discrete in nature. The transfer function of the spread sequence modulator $h_m[n]$ can be regarded as an active filter assigned to the m th user i.e., each user is assigned a specific active filter to separate the user from other users. According to the present invention, the length of the sequence is flexible. It can be selected according to the requirements of the system. When the length of the sequence is increased, the effectiveness of overcoming the fading channel will increase. However, when the length of the sequence is increased, the delay of the system increases. The generation of the spread sequence and the spread sequence modulation process can be accomplished in a programmable general-purpose digital signal processor.

Figure 4:
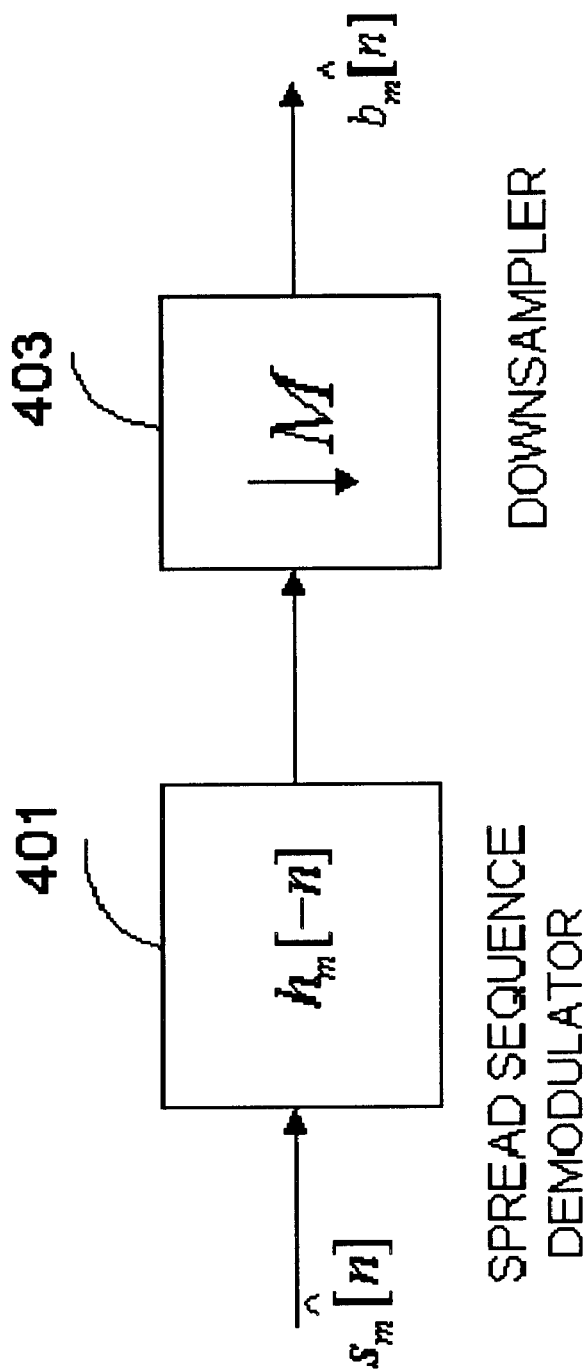
FIG. 4 is a block diagram illustrating the partial view of the receiver to which the present invention is applied.

FIG. 4 is block diagram illustrating the partial view of a receiver, which employs the spread sequence design of the present invention. The receiver could be either coherent or non-coherent. Received data is demodulated by a spread sequence demodulater 401 and downsampled by a downsampler 403. A similar sequence is employed in the receiver to demodulate the received data stream. Multiple units could be implemented at the receiver to process the delayed versions of the received signal and combine them by maximal ratio, equal gain, or other alternative criteria.

Figure 5:
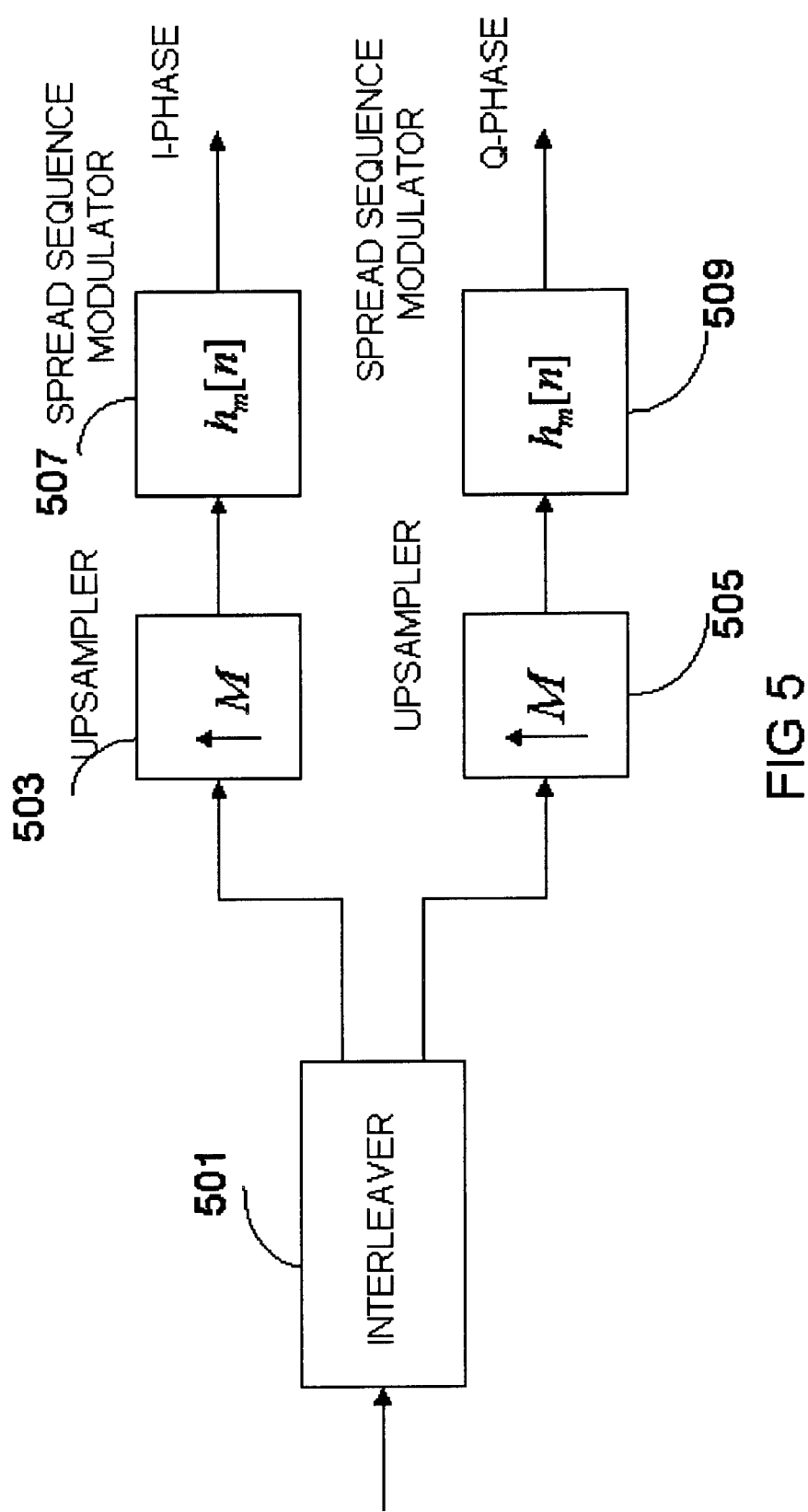
FIG. 5 is a block diagram illustrating the partial view of a communication device to which the present invention is applied.

FIG. 5 is a block diagram illustrating a partial view of a communication device to which the present invention is applied. The interleaver 501 assigns two series of data to the I-phase and the Q-phase in the QPSK modulation respectively. Modulators 503 and 507 are upsampler and spread sequence modulators respectively for the I-phase. Modulators 505 and 509 are upsampler and spread sequence modulators respectively for the Q-phase. The same spread sequence is used for both the I-phase and the Q-phase spread sequence modulators.

An important feature of the spread sequence in accordance with the present invention is that the length is longer than the inter-symbol duration. Digital data symbols are convolved with the spread sequence before transmitted. The length of the sequence is flexible. It can be selected according to the requirement. When the length of the sequence is increased, the effectiveness of overcoming the fading channel increases. However, when the length of the sequence is increased, the delay of the system increases.

In comparison with the conventional CDMA system, the spread sequence implementation in accordance with the present invention is not complicated and does not require additional bandwidth.

The invention has been described with reference to the preferred embodiments. Those skilled in the art will perceive improvements, changes, and modifications. Such improvements, changes, and modificatoins are intended to be covered by the appended claims.

The following is claimed:

1. A code division multiple access communication system with a set of spread sequences, the system comprising:
    an orthogonal code generator to generate an orthogonal matrix;
    cascading stages including at least one of an addition, subtraction or shifting operation on the orthogonal matrix; and
    random permutation matrices used at every cascading stage to randomize the spread sequences;
    wherein data symbols are spread by the spread sequences and overlap neighboring data symbols.

2. The code division multiple access communication system of claim 1, wherein the spread sequences are flexible in length according to system performance requirements.

3. The code division multiple access communication system of claim 1, wherein the spread sequences vary with time by using pre-determined permutation matrices.

4. The code division multiple access communication system of claim 1, further comprising:
    an interleaving coder for encoding the data symbols into a first data series and a second data series;
    an assignor to assign the first data series to the I-phase in a QPSK modulator and to assign the second data series to the Q-phase in a QPSK modulator;
    a first upsampler and sequence modulator for the first data series assigned to the I-phase; and
    a second upsampler and sequence modulator for the second data series assigned to the Q-phase.

5. The code division multiple access communication system of claim 4, wherein the spread sequences vary with time by using pre-determined random permutation matrices.

6. The code division multiple access communication system of claim 1, wherein the orthogonal code generator is a Walsh-Hadamard code generator.

7. The code division multiple access communication system of claim 5, wherein the spread sequences are integer valued.

8. The code division multiple access communication system of claim 5, wherein the spread sequences are implemented using simple integer arithmetic.

9. The code division multiple access communication system of claim 5, wherein the spread sequences vary with time by using pre-determined random permutation matrices.

10. The code division multiple access communication system of claim 6, further comprising:
    an interleaving coder for encoding the data symbols into a first data series and a second data series;
    an assignor to assign the first data series to the I-phase in a QPSK modulator and to assign the second data series to the Q-phase in a QPSK modulator;
    a first upsampler and sequence modulator for the first data series assigned to the I-phase; and
    a second upsampler and sequence modulator for the second data series assigned to the Q-phase.

11. The code division multiple access communication system of claim 10, wherein the sequences are integer valued.

12. The code division multiple access communication system of claim 10, wherein the sequences are implemented using simple integer arithmetic.

13. The code division multiple access communication system of claim 10, wherein the sequences vary with time by using pre-determined random permutation matrices.

* * * * *